United States Patent
Pajak et al.

(10) Patent No.: US 9,591,058 B2
(45) Date of Patent: Mar. 7, 2017

(54) RAPID RECOVERY METHOD FOR INCOMPLETE FILE TRANSFER FROM SENDER TO RECIPIENT

(71) Applicant: TELLABS OPERATIONS, INC., Naperville, IL (US)

(72) Inventors: Arthur M. Pajak, Lombard, IL (US); Zbigniew Pigula, Wood Dale, IL (US); Chris O'Brien, North Aurora, IL (US)

(73) Assignee: CORIANT OPERATIONS, INC., Naperville, IL (US)

( * ) Notice: Subject to any disclaimer, the term of this patent is extended or adjusted under 35 U.S.C. 154(b) by 374 days.

(21) Appl. No.: 14/038,240

(22) Filed: Sep. 26, 2013

(65) Prior Publication Data
US 2015/0089017 A1   Mar. 26, 2015

(51) Int. Cl.
  *G06F 15/16* (2006.01)
  *H04L 29/08* (2006.01)
(52) U.S. Cl.
  CPC .................................. *H04L 67/06* (2013.01)
(58) Field of Classification Search
  CPC .... G04L 67/06; G06F 17/30324; H04L 67/06
  USPC ......................................................... 709/217
  See application file for complete search history.

(56) References Cited

U.S. PATENT DOCUMENTS

| | | | | |
|---|---|---|---|---|
| 6,269,080 B1* | 7/2001 | Kumar | ................... | H04L 1/1614 370/236 |
| 6,505,253 B1* | 1/2003 | Chiu | ................... | H04L 12/1868 370/229 |
| 6,526,022 B1* | 2/2003 | Chiu | ................... | H04L 1/0002 370/229 |
| 7,337,316 B1* | 2/2008 | Evans | ................... | H04L 63/12 380/262 |
| 2005/0114666 A1* | 5/2005 | Sudia | ................... | H04L 9/3236 713/175 |
| 2010/0118885 A1* | 5/2010 | Congdon | ................... | H04L 49/254 370/419 |
| 2010/0205499 A1* | 8/2010 | Axelsson | ................... | H04L 1/1614 714/748 |
| 2011/0087915 A1* | 4/2011 | Zhang | ................... | H04L 12/1854 714/2 |
| 2011/0119348 A1* | 5/2011 | Gibbons | ................... | G06F 8/63 709/217 |

(Continued)

OTHER PUBLICATIONS

Kurose et al. Computer Networking "A Top-Down Approach", 2000, Pearson, 6th edition, pp. 208-228.*

*Primary Examiner* — Anthony Mejia
(74) *Attorney, Agent, or Firm* — Fitzpatrick, Cella, Harper & Scinto (57) ABSTRACT

Recovery of an incomplete transfer of a file from a sender to at least one recipient connected to the sender via a network is disclosed. In an example embodiment, the at least one recipient receives one or more packets of the file sent by the sender via the network. The at least one recipient sets a bit in a bitmap, for each received packet, to efficiently keep track of and request for retransmission of missing packets. Thus, after the file is sent by the sender, the at least one recipient requests from the sender a retransmission of any packet corresponding to a bit that has not been set. The sender then sends packets including the missing packets via unicast to the at least one recipient which has sent a request for retransmission.

18 Claims, 9 Drawing Sheets

(56) References Cited

U.S. PATENT DOCUMENTS

| | | | |
|---|---|---|---|
| 2011/0222449 A1* | 9/2011 | Goldberg | H04Q 9/00 370/311 |
| 2012/0130949 A1* | 5/2012 | Picken | G06F 17/30115 707/626 |
| 2013/0223336 A1* | 8/2013 | Lindner | H04L 47/35 370/328 |

* cited by examiner

RAPID RECOVERY METHOD FOR INCOMPLETE FILE TRANSFER FROM SENDER TO RECIPIENT

BACKGROUND

Field

Example aspects described herein relate generally to a file transfer between a sender and a recipient connected via a network, and more particularly to recovery of lost or corrupt data packets during a file transfer between a sender and a recipient via a network.

Description of the Related Art

Generally speaking, in large multi-shelf systems such as telecommunication systems, or any distributed systems where file downloads are sent to various modules via broadcast or multicast, there is a probability of packet loss due to network link quality issues.

In such systems, software downloads, for example, can be multicasted via an unreliable User Datagram Protocol (UDP). For example, when using UDP, packets may be corrupted and therefore never delivered to their destination. Typically, at the end of a download, a checksum (CRC) for the entire file download is calculated. If the calculated checksum does not match the expected checksum, the file download must be repeated, doubling the download time. Repeating the download can dramatically delay an entire system download, for example, during software installation or upgrades, especially when there are many modules but only one file is broadcasted at a time. Repeating the download can also slow down software development efforts when performing tests of downloading new loads.

In one known approach, when a file transfer occurs over an unreliable protocol such as UDP, and the file is corrupted, the entire file is transmitted again. As noted above, retransmitting the entire file can double the download time.

Another known approach is to monitor for corrupted packets as they arrive at their destination, and then request that the corrupted packets be re-sent in real time from the server, such as in a Pretty Good Multicasting protocol. However, such a protocol can add significant complexity to an algorithm used in a file transfer, as the possibility of packets arriving out of order has to be accounted for, as well as missing packets being discarded by the operating system due to an invalid UDP checksum. This added complexity to the algorithm can burden a processor at the receiving side, such that the processor has less time to perform other tasks. This added complexity can also make software more difficult to maintain.

In yet another known approach, a file can be sent via unicast to each module individually, using a reliable file transfer such as TCP/IP instead of UDP/IP. However, using such an approach will typically increase the download time, since the file will have to be downloaded to each module individually, instead of broadcasting the file to all of the modules at the same time via broadcast or multicast.

SUMMARY

Existing limitations associated with the foregoing, as well as other limitations, can be overcome by providing for a file transfer of data from a sender to a recipient connected to the sender via a network, where the recipient efficiently keeps track of which fragments of the file have been received, and requests re-delivery for missing fragments.

Thus, in an example embodiment described herein, a transfer of a file is performed from a sender to at least one recipient connected to the sender via a network. During the transfer, the at least one recipient receives one or more packets of the file sent by the sender via the network. The at least one recipient then sets a bit in a bitmap, for each received packet. After the sender has sent the entire file, the at least one recipient requests from the sender a retransmission of any packet corresponding to a bit that has not been set.

By virtue of the foregoing arrangement, it is possible to quickly recover an incomplete file download, even in situations where the file download is sent via an unreliable protocol such as UDP over IP. In addition, the foregoing arrangement provides for the advantageous effect of providing an overall faster download of a file since only missing packets are typically retransmitted, while reducing network traffic by eliminating a second broadcast download and by resending the individual lost or corrupted packets versus retransmitting the entire file download. The foregoing arrangement also reduces complexity of implementation by not having to take into account packets coming in out of order, since the recipient waits for a complete download before requesting a re-send of data packets.

In another example embodiment, the request by the at least one recipient includes a request that the sender re-send a specific packet associated with the bit that has not been set.

In other example embodiments, the request by the at least one recipient includes a request that the sender re-send a range of packets which includes a packet associated with the bit that has not been set.

BRIEF DESCRIPTION OF THE DRAWINGS

The disclosure claimed and/or described herein is further described in terms of exemplary embodiments. These exemplary embodiments are described in detail with reference to the drawings. These embodiments are non-limiting exemplary embodiments, wherein:

FIG. 3, which comprises

DETAILED DESCRIPTION

Figure 1:
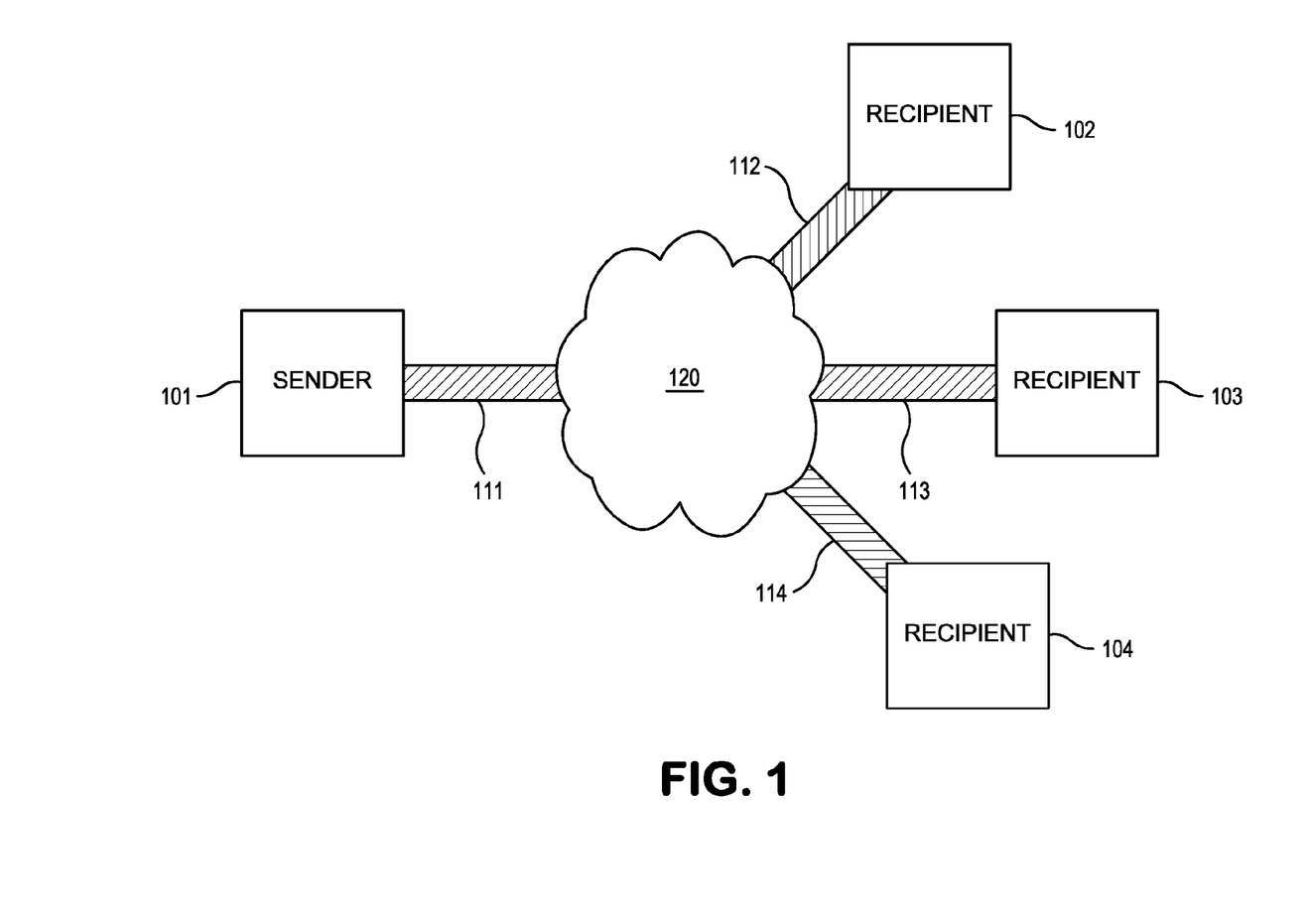
FIG. 1 is a representative view of a sender and one or more recipients, connected via a network, on which an architecture of an example embodiment may be implemented.

FIG. 1 is a representative view of a sender and one or more recipients, connected via a network, on which an architecture of an example embodiment may be implemented. As shown in FIG. 1, sender 101 is connected to recipients 102, 103 and 104 through network 120 for communication therewith. More specifically, sender 101 is connected to network 120 through network interface 111, recipient 102 is connected to network 120 through network interface 112, recipient 103 is connected to network 120 through network interface 113, and recipient 104 is connected to network 120 through network interface 114. In FIG. 1, sender 101 is shown to be connected to recipients 102, 103 and 104 via one network; however, in other example embodiments, senders 101 and recipients 102, 103 and 104 can be connected via more than one network. In addition, there may be more than one sender and more or less than three recipients connected to network 120 or connected to multiple networks.

Network 120 can be an intranet, a local area network (LAN), a wide area network (WAN), the Internet, a network connecting shelves of data equipment, a network within a shelf of data equipment, or any other suitable type of network for transferring data.

Sender 101 is a device such as a server in a server-client system that is capable of sending a transfer of data over a network. However, sender 101 is not limited to sending data, and can also be a device capable of receiving transferred data. Sender 101 can be, for example, a computer, or any other device that is capable of sending and/or receiving a transfer of data over a network.

Recipients 102, 103 and 104 are devices such as clients in a server-client system that are capable of receiving and sending a transfer of data over a network. Recipients 102, 103 and 104 can be, for example, a computer, or any other device that is capable of receiving and/or sending a transfer of data over a network.

Network interfaces 111 to 114 can be wired or wireless physical interfaces. Each of network interfaces 111 to 114 includes one or more ports so as to establish one or more socket connections with the network 120.

In the architecture shown in FIG. 1, a user datagram protocol (UDP) can be used for transferring data between the sender 101 and the recipients 102 to 104. However, UDP is not required, and other internet protocols can be implemented to transfer data.

The inventors herein have considered an arrangement in which the recipients 102 to 104 send a request for a file download to the sender 101. In this considered arrangement, the sender 101 opens the file, reads a certain number of bytes from the file, and sends the certain number of bytes of the file to the recipients 102 to 104 in a UDP/IP data packet. The recipients 102 to 104 receive the packet and store it in a memory. This process is repeated until the entire file is sent. The sender 101 then sends a special packet called a close packet indicating that the download is finished. It is noted that the UDP protocol has a checksum embedded in the packet. If the packet is corrupted during transfer due, for example, to network link quality issues, the packet will be silently discarded by the operating system on a card of the recipients (e.g., protocol stack). After the close packet is received, the recipients 102 to 104 calculate the checksum (CRC) for the file and compare it to the expected CRC. If packets were discarded by the operating system, or were lost in transit, the download will be incomplete, and the CRC will fail. The recipients will then request the download again. In example embodiments described herein, the recipients will request a fragment of the file download rather than the entire download, which is described in detail below in connection with FIGS. 3 and 4A to 4L.

Figure 2:
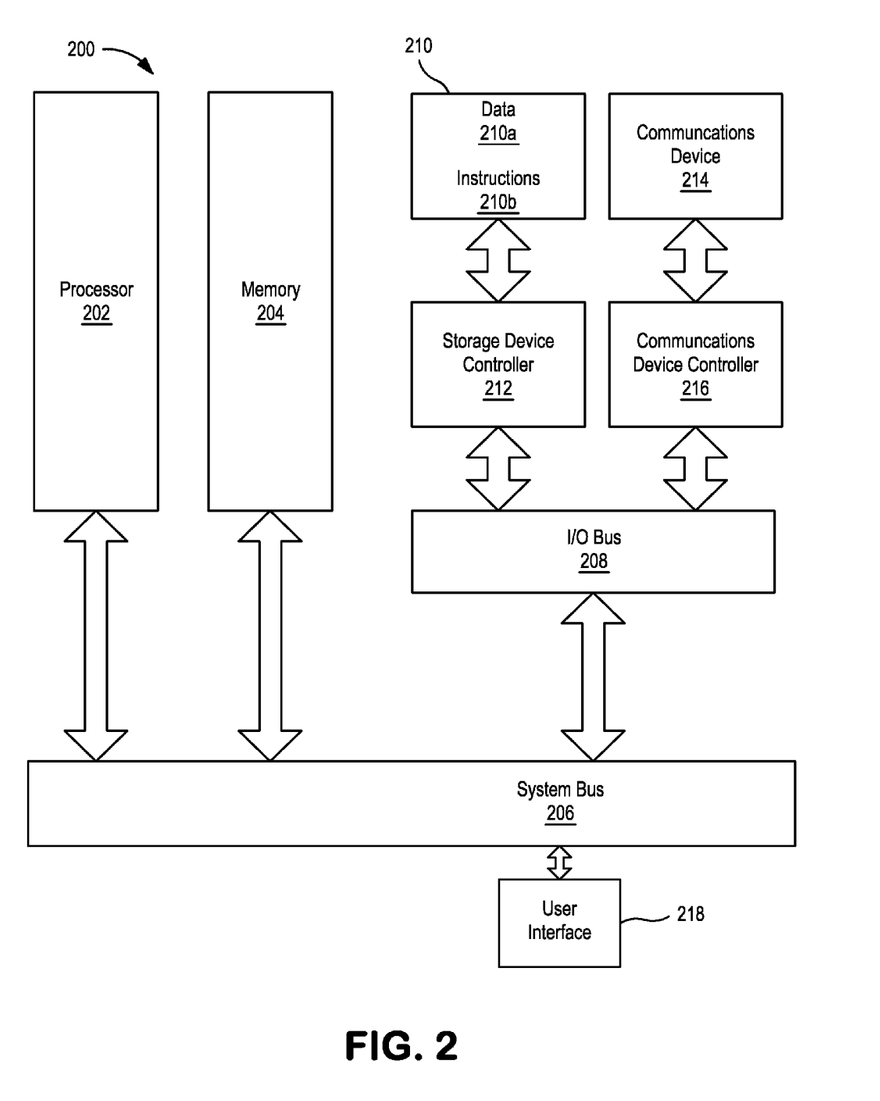
FIG. 2 is an architecture diagram of a processing system in accordance with an example embodiment described herein.

Reference is now made to FIG. 2, which is an architecture diagram of an example data processing system 200, which can be used according to various aspects herein. In one example embodiment, system 200 may further represent, and/or be included in, individual ones of the components illustrated in FIG. 1 (e.g., sender 101 and recipients 102, 103 and 104). Data processing system 200 can be used to send and/or receive data transferred over a network, such as the network 120 described above, according to one example. Data processing system 200 includes a processor 202 coupled to a memory 204 via system bus 206. Processor 202 is also coupled to external Input/Output (I/O) devices (not shown) via the system bus 206 and an I/O bus 208, and at least one input/output user interface 218. Processor 202 may be further coupled to a communications device 214 via a communications device controller 216 coupled to the I/O bus 208 and bus 206. Processor 202 uses the communications device 214 to communicate with other elements of a network, such as, for example, network nodes such as other ones of the devices of FIG. 1, and the device 214 may have one or more input and output ports. Processor 202 also may include an internal clock (not shown) to keep track of time, periodic time intervals, and the like.

A storage device 210 having a computer-readable medium is coupled to the processor 202 via a storage device controller 212 and the I/O bus 208 and the system bus 206. The storage device 210 is used by the processor 202 and controller 212 to store and read/write data 210a, as well as computer program instructions 210b used to implement the procedure(s) described herein and shown in the accompanying drawing(s) herein (and, in one example, to implement the functions represented in FIGS. 3 and 4A to 4L). The storage device 210 also can be used by the processor 202 and the controller 212 to store other types of data, such as a bitmap which is described in detail below in connection with FIGS. 3 and 4A to 4L. In operation, processor 202 loads the program instructions 210b from the storage device 210 into the memory 204. Processor 202 then executes the loaded program instructions 210b to perform any of the example procedure(s) described herein, for operating the system 200.

Figure 3A:
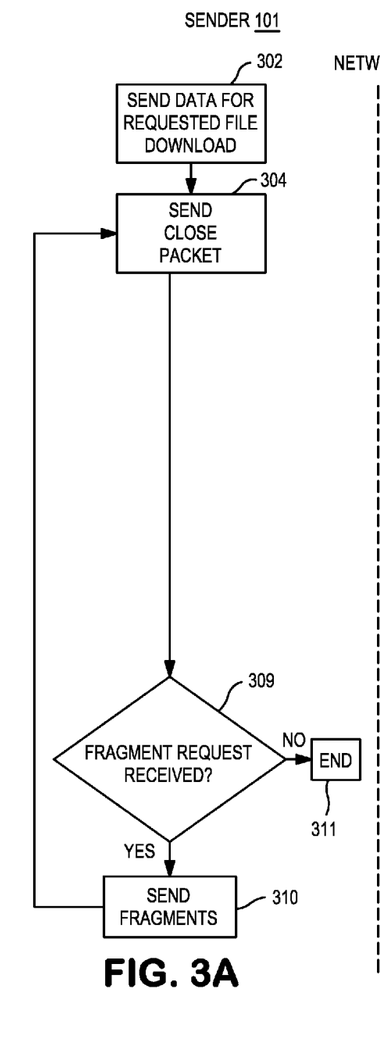
FIGS. 3A and 3B, is a flow diagram that illustrates an example transfer of data from a sender to one or more recipients connected to the sender via a network, in accordance with an example embodiment described herein.
Figure 3B:
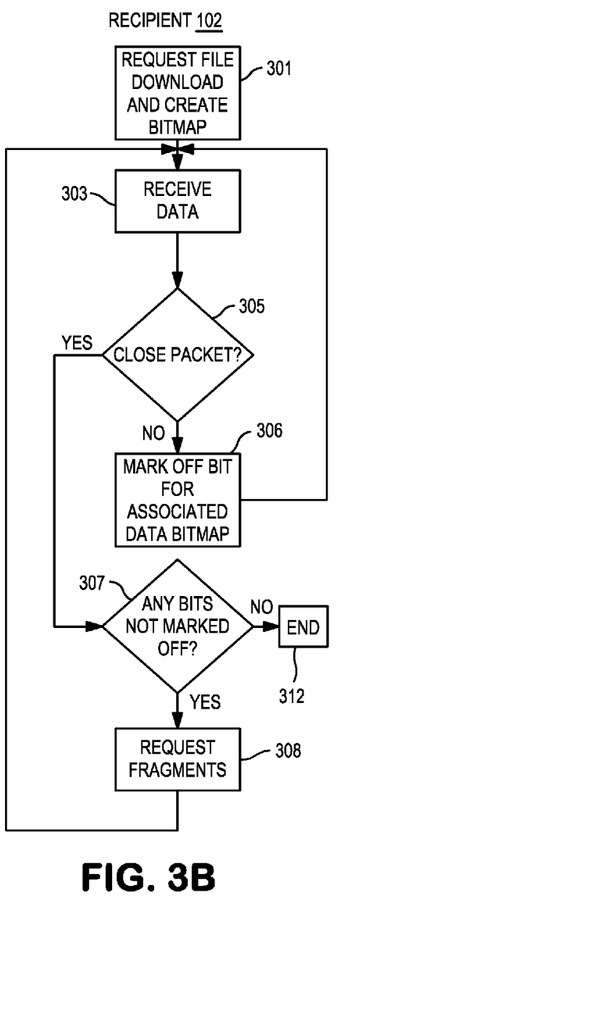

FIG. 3, which comprises FIGS. 3A and 3B, is a flow diagram that illustrates an example transfer of data from the sender 101 to recipient 102 connected to the sender 101 via the network 120 shown in FIG. 1, in accordance with an example embodiment described herein. FIG. 3A shows procedures performed by the sender 101 for the example transfer of data, and FIG. 3B shows procedures performed by the recipient 102 for the example transfer of data. FIG. 3B is described as being performed by recipient 102; however, in other example embodiments, multiple recipients such as recipients 102 to 104 can each separately perform the procedures set forth in FIG. 3B.

As shown in FIG. 3, in block 301, the recipient 102 requests a file transfer or file download from the sender 101. The file includes a sequence of data packets. When requesting the file transfer or file download at block 301, the recipient 102 creates a bitmap including a plurality of bits. The bitmap is created large enough to map the entire file, such that the number of bits in the bitmap is equal to or larger than the number of data packets included in the file. In one example, the recipient 102 creates a bitmap of constant size, accounting for a biggest possible file size for which the recipient can request for download. Each of the plurality of bits is associated with a respective data packet of the sequence of data packets. In other words, one bit of the bitmap represents one data packet of the sequence of data packets. Initially, all of the bits of the bitmap are set to 1. The bitmap is stored, for example, in storage device 210 included in the recipient 102, shown in FIG. 2 described above.

In block 302 (FIG. 3B), in response to receiving a request sent in block 301 from the recipient 102, the sender 101 sends the sequence of data packets over network 120 to the recipient 102. In some example embodiments, where multiple recipients are each separately performing the procedures of FIG. 3B, the sender 101 sends the sequence of data packets via multicast or broadcast at the same time to all of the multiple recipients that sent a request for a file transfer or a file download. In other example embodiments, the sender 101 sends the sequence of data packets via unicast to the recipient 102.

In block 303, the recipient 102 receives the sequence of data packets sent by the sender 101. When receiving a data packet of the sequence of data packets, the recipient 102 stores the data packet, for example, in data storage 210 of the recipient 102. The recipient 102 then determines whether the received data packet is a close packet indicating that the whole sequence of data packets has been sent by the sender (block 305). The recipient 102 determines whether the received data packet is a close packet based on a packet type included in the packet. In this regard, the first byte of every packet is PACKET TYPE. This byte can be, for example, OPEN, DATA, CLOSE, REQUEST or REQUEST_FILE_FRAGMENT. If the packet type if CLOSE, then the recipient 102 determines that the received packet is a close packet. If the recipient 102 determines that the received data packet is a close packet, then block 307 is performed. However, if the recipient 102 determines that the received data packet is not a close packet, then block 306 is performed.

In block 306, the recipient 102 marks off from the bitmap the bit associated with the received data packet. In particular, the recipient 102 derives a packet number for each received data packet, based on a sequence number for the received data packet, assigned at the sender 101. In one example, the sender 101 puts a sequence number SEQUENCE_NB after PACKET TYPE in each DATA packet the sender sends. The SEQUENCE_NB is a current byte count of the file. In this example, the packet number is derived by dividing the current byte count SEQUENCE_NB by a constant size of each packet (e.g., X=1418).

After deriving the packet number for a received data packet, the recipient 102 clears a corresponding bit (i.e., a bit slated to correspond to the packet number) in the bitmap to value 0. Control then passes back to block 303 where the procedure then continues in the above-described manner. Blocks 303, 305 and 306 are repeated for every non-close data packet that is received by the recipient 102. Since clearing of bits to value 0 is used to keep track of received data packets, the recipient 102 can keep track of received data packets very efficiently without requiring a large amount of additional processing overhead.

In block 304, after sending all of the sequence of data packets, the sender 101 sends a close packet to the recipient 102 indicating that all of the plurality of data packets have been sent by the sender 101. After receiving the close packet in block 303, the recipient 102 determines in block 305 that a close packet has been received, and control then passes to block 307.

In block 307, after determining that a close packet has been received, the recipient 102 performs a scan of the bitmap to check a setting of each bit of the bitmap. If all of the sequence of data packets were received, every bit of the bitmap should be set to 0. However, if a bit remains set to 1, then a packet of the corresponding packet number is deemed to have never arrived because, for example, it was lost in transit or it was discarded by an operating system because of an invalid checksum, or the like. In some example embodiments, the recipient 102 scans the bitmap 32 bits at a time. In other example embodiments, the recipient 102 scans the bitmap 64 bits at a time on a 64 bit processor. Of course, these examples are not limiting, and, in other embodiments, other scan rates and processor sizes can be employed.

If a scan in block 307 indicates that all of the bits of the bitmap have been marked off (i.e., set to 0), then the file download is deemed complete and control passes to block 312 where all packets are deemed to have been received properly, and the procedure ends. On the other hand, if a scan in block 307 indicates that one or more bits of the bitmap have not been marked off (i.e., still remains as value '1'), then the recipient 102 creates a list of packet numbers that never arrived based on the scan and sends a fragment request to the sender 101 (block 308). The fragment request includes a request that the sender 101 re-send a portion of the plurality of data packets based on the performed scan.

In one example embodiment herein, the fragment request includes a request that the sender 101 re-send specific data packets corresponding to the packet numbers associated with the bits that have not been marked off. In one example, 32 bit packet numbers can be used, which supports very large (e.g., over 100 MB) files, and up to 300 packets can be requested by a single fragment request, although these examples are not limiting. This keeps the request packet to a standard size of up to 1500 bytes per packet, where 300 packet numbers fit in one request. If a file is determined (in block 307) by the recipient 102 to be missing more than 300 packets, then multiple fragment requests are sent by the recipient 102 to the sender 101 up to a predefined number of times. The predefined number can be, for example, large enough to recover missing data packets for up to 10% of the entire file.

In some example embodiments, if the recipient 102 determines in block 307 that the number of bits exceeds a predefined threshold (e.g., if more than 10% of the entire file is missing), then the recipient 102 sends a request to the sender 101, requesting that the sender 101 re-send the entire file (i.e., all of the sequence of data packets).

In another example embodiment, the fragment request sent in block 308 includes a request that the sender 101 re-send a range of data packets which includes the data packets for the packet numbers associated with the bits that have not been marked off. In this regard, packet range numbers, instead of actual packet numbers, are used in order to request multiple packets (e.g., more than 300 packets) in a single fragment request. Packet range numbers can be used, for example, if continuous or almost continuous packet numbers are detected as missing. For example, if packet numbers 1434, 1437, and 1439 through 1460 were detected as missing, the recipients 102 to 104 can request that the sender 101 re-send a range of packet numbers 1434 through 1460.

In block 309, the sender 101 determines whether a fragment request has been received. If the sender 101 determines that no fragment request has been received, then the file download is deemed complete and the procedure ends (block 312). If the sender 101 determines that a fragment request has been received, the sender 101 re-sends the portion of the sequence of data packets requested in the fragment request, via unicast to the recipient 102, based on the received fragment request (block 310). In particular, the sender 101 opens the file again from storage device 210 of the sender 101, seeks through the file sequentially to identify portions of the file requested in the fragment request, and sends the identified portions of the file to the recipient 102.

In example embodiments where multiple recipients such as recipients 102 to 104 are separately performing FIG. 3B, and the sender 101 determines in block 309 that a fragment request has been received from more than one of the recipients, the sender 101 re-sends the portion of the sequence of data packets requested in each respective fragment request via unicast to each respective recipient which sent the fragment request, on a first-come, first-served basis, based on the received fragment requests (block 310). In these example embodiments, the portions of the sequence of data packets are not re-sent via multicast or broadcast to all of the recipients.

In block 304, after re-sending the portion of the sequence of data packets to the recipient 102, the sender 101 sends a close packet to the recipient 102 indicating that all of the data packets requested in the fragment request have been sent.

Referring back to FIG. 3B, blocks 303 and 305 to 307 are performed again by the recipient 102, in the above-described manner, based on each of the latest-received packets sent from the sender. The recipient 102 performs a second scan of the bitmap to check each bit of the bitmap (block 307). In this regard, upon receiving the missing packets, the recipient 102 clears (in block 308) remaining bits in the bitmap (the bits that were not cleared since the original first download attempt). In a case that one or more bits of the bitmap are determined to not have been marked off based on the performed second scan in block 307, the recipient 102 sends another fragment request to the sender 101 in block 308, requesting that the sender 101 re-send a portion of the sequence of data packets determined to be missing, based on the performed second scan, in the above-described manner.

In example embodiments where the number of packet drops is a constant percentage (e.g., occasional burst or errors will drop 5% of packets), the fragment request will typically contain a fewer number of packets than in the above example and most likely will result in the file being completely received in response to a single fragment request.

In some example embodiments, blocks 303 and 305 to 308 are repeated until the recipient 102 determines in block 307 that all of the bits in the bitmap are set to 0. In other example embodiments, blocks 303 and 305 to 308 are repeated a predefined number of times, before the recipient 102 sends a request that the sender 101 re-send the entire file. The predefined number of times can be calculated by the recipient 102 based on an actual size of the file requested for download. In one example, the predefined number of times can be calculated large enough to recover up to 10% of the entire file. Of course, this example is not limiting, and, in other embodiments, other methods of calculating the predefined number of times can be employed. If blocks 303 and 305 to 308 are repeated more than the predefined number of times, as determined by the recipient 102 in block 307, then the recipient 102 can request for the entire file to be re-sent by the sender 101.

In block 307, if the recipient 102 determines that all of the bits in the bitmap are set to 0, then a CRC check is triggered and the file download is deemed to be complete (block 312).

By virtue of the foregoing arrangement, it is possible to quickly recover an incomplete file download, even in cases where, for example, the file download is sent via an unreliable protocol such as UDP over IP. In addition, the foregoing arrangement provides for the advantageous effect of providing an overall faster download of a file since only missing packets are typically retransmitted, while reducing network traffic by eliminating or reducing the need for a second broadcast download and by resending the individual lost or corrupted packets versus retransmitting the entire file download. The foregoing arrangement, in one example, also reduces complexity of implementation by not having to take into account packets coming in out of order, since the recipient waits for a complete download before requesting a re-send of data packets.

In addition, the procedures described above in connection with FIGS. 3A and 3B as performed, for example, in an architecture shown in FIG. 1, are advantageously both backward compatible and forward compatible. Regarding backward compatibility, if a sender in a system is preloaded, for example, with support for the procedures described in FIGS. 3A and 3B, recipients which are not loaded with support for the procedures described in FIGS. 3A and 3B may not request to receive missing packets, and download failures may be retransmitted via multiple broadcasts. With respect to forward compatibility, if a recipient having support for the procedures described in FIGS. 3A and 3B is inserted in a system with a sender that is not preloaded with support for the procedures described in FIGS. 3A and 3B, the recipient may attempt to request that the sender retransmit missing packets. However, the sender may treat the request as unrecognized and may not reply. Here, the recipient can request a retransmission for the entire file.

Figure 4A:
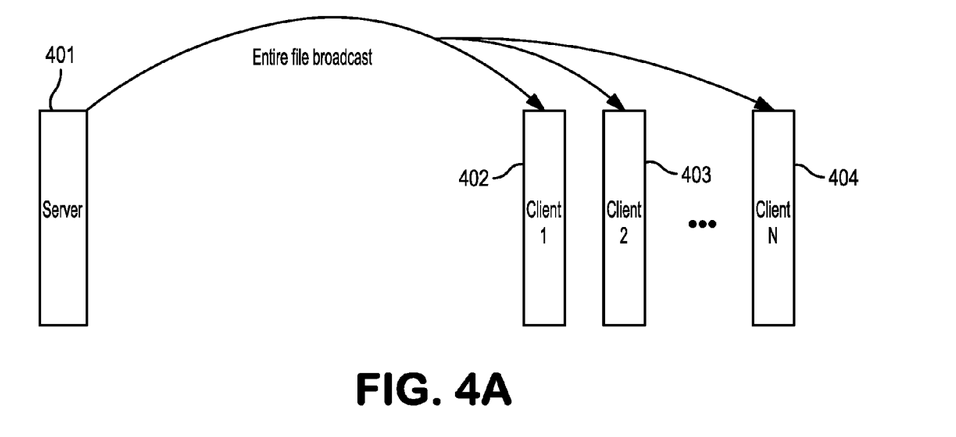
FIGS. 4A to 4L are illustrations for describing example transfers of data in a client-server system, in accordance with example embodiments described herein.

Turning to FIGS. 4A to 4L, an example transfer of data in a client-server system will now be described, in accordance with example embodiments herein. In FIG. 4A, the server 401 broadcasts a requested file to all of the clients (e.g., client 1 (402), client 2 (403) . . . client N (404)). The server 401 broadcasts the entire file. In some example embodiments, there is a single client. In other example embodiments, there are N number of clients. Server 401 can correspond to sender 101 of FIG. 1, and client 1 (402), client 2 (403) . . . client N (404) can correspond to recipients 102 to 104 of FIG. 1.

Figure 4B:
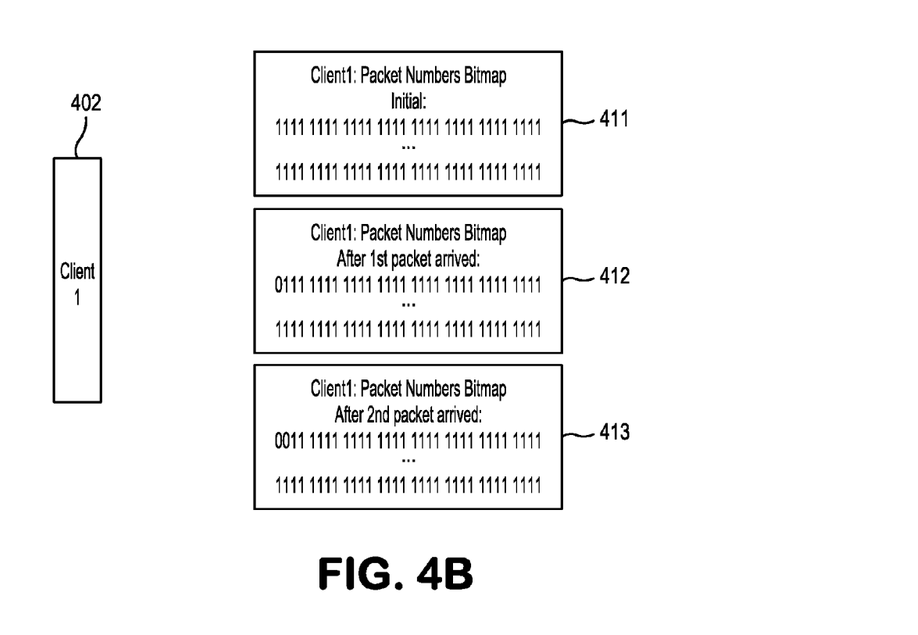

In FIG. 4B, each client keeps track of which file fragments (e.g., packet numbers) were received by marking off a single bit in a bitmap, for each corresponding received packet associated with the number. FIG. 4B represents the bitmap states resulting from performance of the method of FIG. 3B. Reference numeral 411 represents a created packet numbers bitmap for client 1 (402) (i.e., a bitmap stored in that client, before any packet has been received). As shown in FIG. 4B, each of the bits in the bitmap 411 are set to value 1. Reference numeral 412 represents the bitmap for client 1 (402) after a first data packet has been received. In bitmap 412, the first bit is set to 0 representing that the first data packet has been received. Reference numeral 413 represents the bitmap for client 1 (402) after a second data packet has been received. In bitmap 413, both the first bit and the second bit are set to 0, representing that first and second data packets have been received.

Figure 4C:
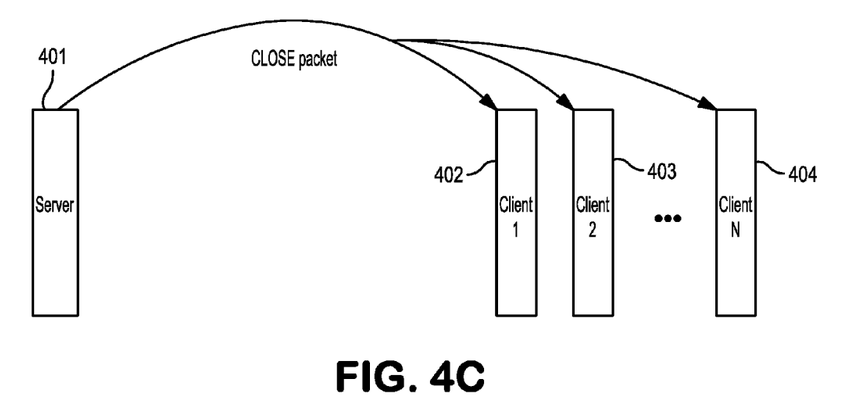
Figure 4D:
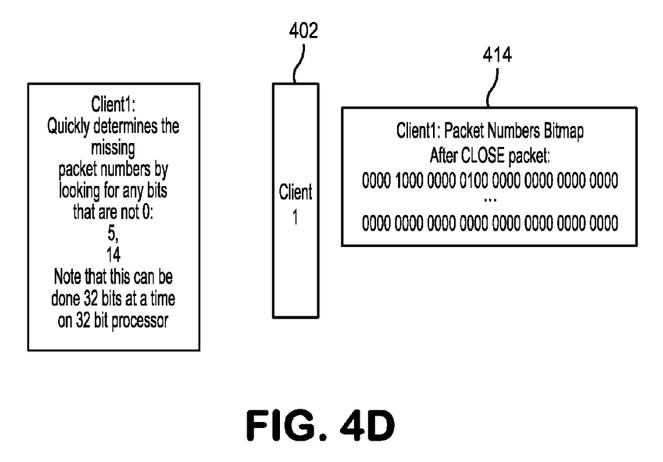

In FIG. 4C, the server 401 indicates an end of transmission by sending a close packet to each of the clients. This indicates an end of the file. In FIG. 4D, upon receiving the close packet (see, e.g., block 304 of FIG. 3B), client 1 (402) determines which file fragments (e.g., packet numbers) are still missing, as indicated by bits that are still set to value 1 in the bitmap. For example, in bitmap 414 of client 1 (402)(FIG. 4D), a 1 remains set for packet numbers 5 and 14. Thus, client 1 (402) can quickly determine the missing numbers by looking for any bits that are not 0. In one example, this determination can be performed 32 bits at a time on a 32 bit processor.

Figure 4E:
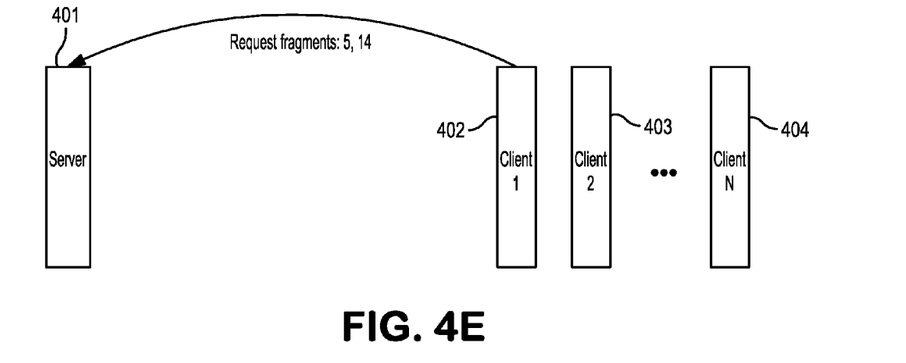
Figure 4F:
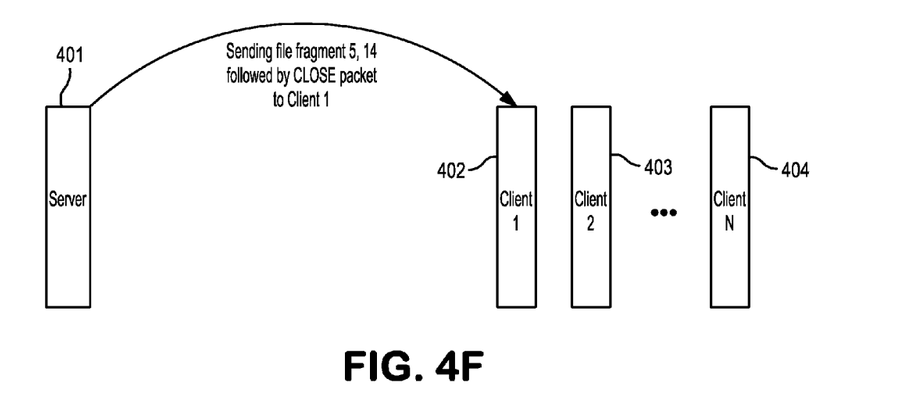

In FIG. 4E, each client requests file fragments (e.g., packet numbers) it missed if any, instead of requesting a download of the entire file. The server 401 serves the clients on a first come, first served basis. A request for packet numbers 5 and 14 of client 1 (402) is shown in FIG. 4E. FIG. 4F shows the server 401 unicasting the requested file fragments (e.g., packet numbers 5 and 14) to client 1 (402). In one example, the file fragments are not broadcasted to all of the clients. After sending the file fragments to the client, the server sends a close packet, as shown in FIG. 4F.

Figure 4G:
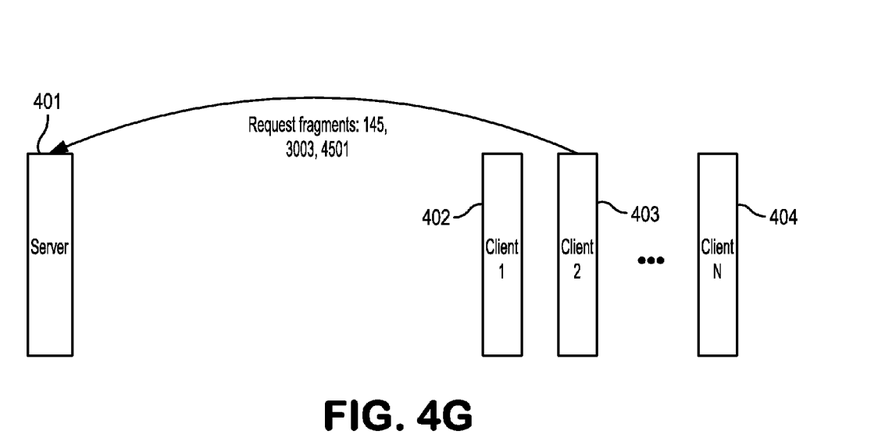
Figure 4H:
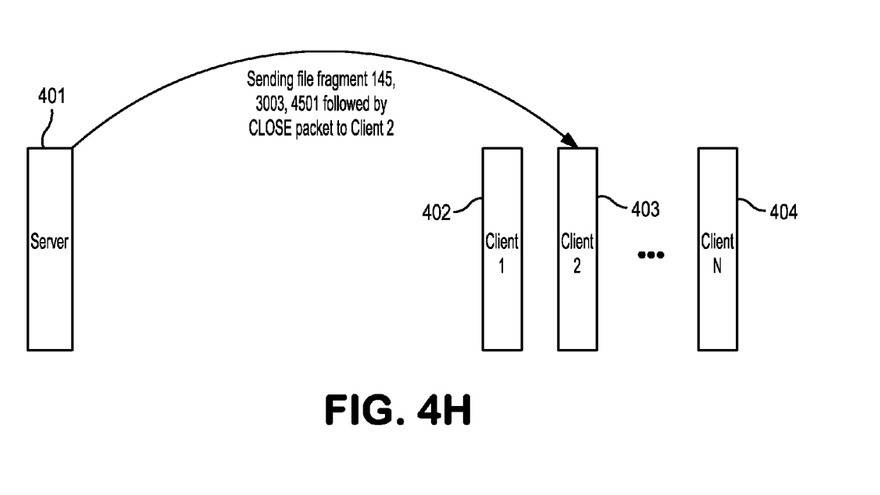

FIG. 4G shows a request, by client 2 (403) for packet numbers 145, 3003 and 4501. A similar request may be repeated for each other client, if they also were missing those packets. FIG. 4H shows the server 401 unicasting the requested file fragments (e.g., packet numbers 145, 3003 and 4501) to client 2 (403), followed by a close packet. The foregoing is repeated for each client which may have requested file fragments.

Figure 4I:
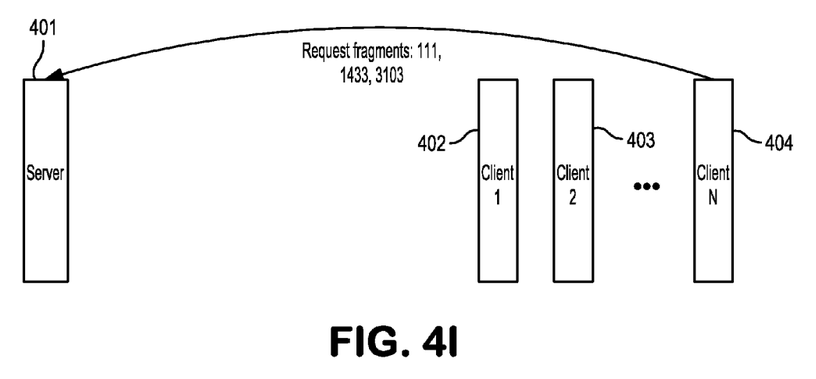
Figure 4J:
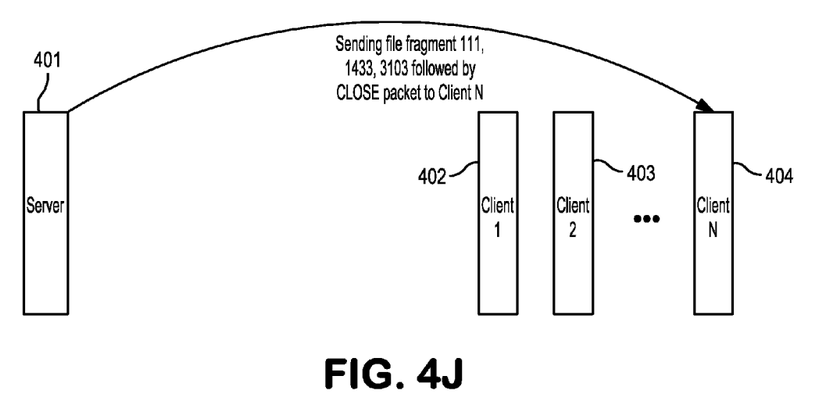

FIGS. 4I and 4J show a request for packets numbers 111, 1433 and 3101, by client N (404), a unicast of those packets and a close packet by server 401, respectively.

Figure 4K:
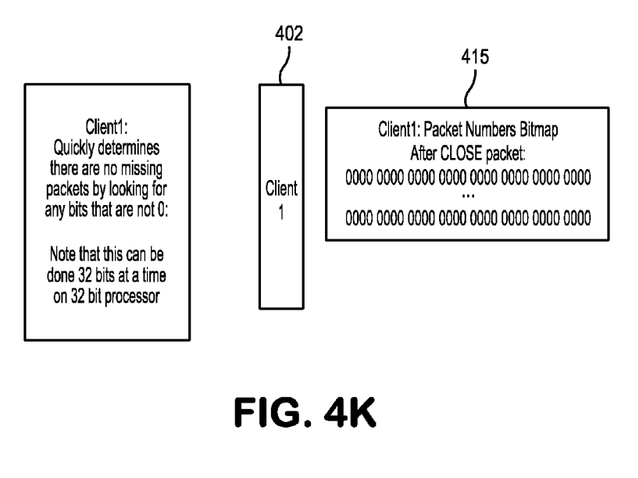
Figure 4L:
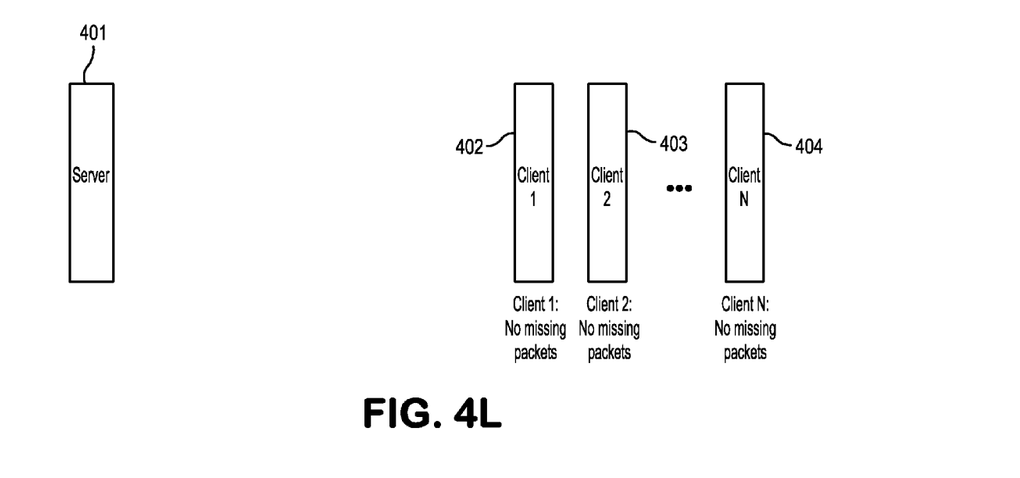

In FIG. 4K, upon receiving the close packet, client 1 (402) determines which file fragments (e.g., packet numbers) that are still missing (i.e., which bits are still marked as 1 on the bitmap). If a file is still incomplete, for example, for client 1 (402), then the procedures described above in connection with FIGS. 4F and 4G are repeated. The transfers finish when the clients have a complete copy of the file, represented in FIG. 4L.

The devices and/or servers described herein may be, in one non-limiting example, a computer or farm of computers that facilitate the transmission, storage, and reception of information and other data between different points. From a hardware standpoint, in one example a server computer will typically include one or more components, such as one or more microprocessors (also referred to as "controllers") (not shown), for performing the arithmetic and/or logical operations required for program execution. Also in one example, a server computer will also typically include disk storage media (also referred to as a "memory"), such as one or more disk drives for program and data storage, and a random access memory, for temporary data and program instruction storage. From a software standpoint, in one example a server computer also contains server software resident on the disk storage media, which, when executed, directs the server computer in performing its data transmission and reception functions. As is well known in the art, server computers are offered by a variety of hardware vendors, can run different operating systems, and can contain different types of server software, each type devoted to a different function, such as handling and managing data from a particular source, or transforming data from one format into another format.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of example aspects described herein may be provided as a computer program product, or software, that may include an article of manufacture on a machine-accessible, computer-readable, and/or machine-readable medium (memory) having instructions. The instructions on the machine-accessible, computer-readable and/or machine-readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine-accessible medium", "computer-readable medium", "machine-readable medium", or "memory" used herein shall include any medium that is capable of storing, encoding, or transmitting a sequence of instructions for execution by the machine and that cause the machine to perform any one of the procedures described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs. Indeed, the numbered parts of the above-identified procedures represented in the drawings may be representative of operations performed by one or more respective modules, wherein each module may include software, hardware, or a combination thereof.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

Although example aspects herein have been described in certain specific example embodiments, many additional modifications and variations would be apparent to those skilled in the art. It is therefore to be understood that the various example embodiments herein may be practiced otherwise than as specifically described. Thus, the present example embodiments, again, should be considered in all respects as illustrative and not restrictive.

What is claimed is:

1. A method for transfer of a file from a sender to at least one recipient connected to the sender via a computer network, the method comprising:
    creating, by the at least one recipient, a bitmap including a plurality of bits, wherein each of the bits in the bitmap is initially set to a value of 1;
    receiving, by the at least one recipient, one or more packets of the file sent by the sender via the computer network;
    determining, by the at least one recipient, for each of the one or more received packets, whether a received packet is a close packet by analyzing a packet type included in the received packet;
    clearing, by the at least one recipient, in a case the received packet is not a close packet, a bit in the bitmap to a value of 0, for the received packet; and
    in a case the received packet is a close packet,
        a) scanning, by the at least one recipient, the bitmap to check a setting of each bit of the bitmap,
        b) creating, by the at least one recipient, a list of packet numbers corresponding to one or more bits in the bitmap that are set to a value of 1, in accordance with the scanning, and
        c) requesting from the sender, by the at least one recipient, a retransmission of one or more packets corresponding to the list of packet numbers, wherein the one or more packets requested to be retransmitted make up less than the entirety of the file.

2. The method according to claim 1, wherein the request by the at least one recipient includes a request that the sender re-send a specific packet associated with the one or more bits in the bitmap that are set to a value of 1.

3. The method according to claim 1, wherein the request by the at least one recipient includes a request that the sender re-send a range of packets which includes a packet associated with the one or more bits in the bitmap that are set to a value of 1.

4. The method according to claim 1, wherein at least two recipients receive the one or more packets sent by the sender via broadcast,
wherein each recipient of the at least two recipients clears a bit in a bitmap to a value of 0, for each received packet, and
wherein each recipient of the at least two recipients requests from the sender a retransmission of any packet corresponding to a bit that is set to a value of 1, the retransmission to be sent to each recipient via unicast.

5. The method according to claim 4, wherein the sender retransmits in response to each request sent by each recipient, on a first-come, first-served basis.

6. A recipient connected to a sender via a computer network, the recipient comprising:
a processor and a memory that cooperate to:
create a bitmap including a plurality of bits, wherein each of the bits in the bitmap is initially set to a value of 1,
receive one or more packets of a file sent by the sender via the computer network,
determine, for each of the one or more received packets, whether a received packet is a close packet by analyzing a packet type included in the received packet,
clear, in a case the received packet is not a close packet, a bit in the bitmap to a value of 0, for the received packet, and
in a case the received packet is a close packet,
(a) scan the bitmap to check a setting of each bit of the bitmap,
(b) create a list of packet numbers corresponding to one or more bits in the bitmap that are set to a value of 1, in accordance with the scanning, and
(c) request from the sender a retransmission of one or more packets corresponding to the list of packet numbers, wherein the one or more packets requested to be retransmitted make up less than the entirety of the file.

7. The recipient according to claim 6, wherein the request includes a request that the sender re-send a specific packet associated with the one or more bits that are set to a value of 1.

8. The recipient according to claim 6, wherein the request includes a request that the sender re-send a range of packets which includes a packet associated with the one or more bits that are set to a value of 1.

9. The recipient according to claim 6, wherein the recipient and at least one other recipient receive the one or more packets sent by the sender via broadcast,
wherein the recipient and at least one other recipient each clear a bit in a bitmap to a value of 0, for each received packet, and
wherein the recipient and at least one other recipient each request from the sender a retransmission of any packet corresponding to a bit that is set to a value of 1, the retransmission to be sent to each recipient via unicast.

10. The recipient according to claim 9, wherein the sender retransmits in response to each request sent by each of the recipient and at least one other recipient, on a first-come, first-served basis.

11. A system including a sender and at least one recipient connected to the sender via a computer network,
the sender comprising:
a processor arranged to send one or more packets of a file to the at least one recipient via the computer network, and
the at least one recipient comprising:
a processor and a memory that cooperate to:
create a bitmap including a plurality of bits, wherein each of the bits in the bitmap is initially set to a value of 1,
receive the one or more packets of the file sent by the sender via the computer network,
determine, for each of the one or more received packets, whether a received packet is a close packet by analyzing a packet type included in the received packet;
clear, in a case the received packet is not a close packet, a bit in the bitmap to a value of 0, for the received packet, and
in a case the received packet is a close packet,
(a) scan the bitmap to check a setting of each bit of the bitmap,
(b) create a list of packet numbers corresponding to one or more bits in the bitmap that are set to a value of 1, in accordance with the scanning, and
(c) request from the sender a retransmission of one or more packets corresponding to the list of packet numbers, wherein the one or more packets requested to be retransmitted make up less than the entirety of the file.

12. The system according to claim 11, wherein the processor of the sender is further arranged to retransmit, based on the request from the at least one recipient, any packet corresponding to a bit that is set to a value of 1.

13. The system according to claim 12, wherein the request includes a request that the sender re-send a specific packet associated with the bit that is set to a value of 1.

14. The system according to claim 12, wherein the request includes a request that the sender re-send a range of packets which includes a packet associated with the bit that is set to a value of 1.

15. The system according to claim 12, wherein the sender sends the one or more packets to at least two recipients via broadcast,
wherein each recipient of the at least two recipients clears a bit in a bitmap to a value of 0, for each received packet, and
wherein the sender retransmits, based on a request received from one of the at least two recipients, via unicast to the one recipient of the at least two recipients any packet corresponding to a bit that is set to a value of 1.

16. The system according to claim 15, wherein the sender retransmits in response to each request sent by each recipient of the at least two recipients, on a first-come, first-served basis.

17. A non-transitory computer-readable storage medium on which is stored computer-executable process steps for causing a recipient to perform the following:
create a bitmap including a plurality of bits, wherein each of the bits in the bitmap is initially set to a value of 1;

receive one or more packets of a file sent by a sender via a computer network;

determine, for each of the one or more received packets, whether a received packet is a close packet by analyzing a packet type included in the received packet;

clear, in a case the received packet is not a close packet, a bit in the bitmap to a value of 0, for the received packet; and in a case the received packet is a close packet,
- (a) scan the bitmap to check a setting of each bit of the bitmap,
- (b) create a list of packet numbers corresponding to one or more bits in the bitmap that are set to a value of 1, in accordance with the scanning, and
- (c) request a retransmission of one or more packets corresponding to the list of packet numbers, wherein the one or more packets requested to be retransmitted make up less than the entirety of the file.

18. A non-transitory computer-readable storage medium on which is stored computer-executable process steps for causing the processor of the sender according to claim 11 to send one or more packets of a file to the at least one recipient via the computer network.

\* \* \* \* \*